US011604607B2

United States Patent
Duan et al.

(10) Patent No.: US 11,604,607 B2
(45) Date of Patent: *Mar. 14, 2023

(54) REDUCE SYSTEM ACTIVE POWER BASED ON MEMORY USAGE PATTERNS

(71) Applicant: Micron Technology, Inc., Boise, ID (US)

(72) Inventors: Xinghui Duan, Shanghai (CN); Eric Kwok Fung Yuen, Dublin, CA (US); Zhi Ping Yu, Shanghai (CN); Guanzhong Wang, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/331,357

(22) Filed: May 26, 2021

(65) Prior Publication Data

US 2021/0279010 A1 Sep. 9, 2021

Related U.S. Application Data

(63) Continuation of application No. 16/484,066, filed as application No. PCT/CN2018/124813 on Dec. 28, 2018, now Pat. No. 11,029,883.

(51) Int. Cl.
*G06F 1/324* (2019.01)
*G06F 3/06* (2006.01)
(Continued)

(52) U.S. Cl.
CPC .............. *G06F 3/0659* (2013.01); *G06F 1/10* (2013.01); *G06F 1/324* (2013.01); *G06F 3/0625* (2013.01);
(Continued)

(58) Field of Classification Search
CPC .......... G06F 3/0659; G06F 1/10; G06F 1/324; G06F 3/0625; G06F 3/0673;
(Continued)

(56) References Cited

U.S. PATENT DOCUMENTS 6,209,067 B1 3/2001 Collins et al.
8,578,244 B2 * 11/2013 Roohparvar ..... G11C 29/12005
365/201
(Continued)

FOREIGN PATENT DOCUMENTS

CN 101630233 A 1/2010
CN 103890724 A 6/2014
(Continued)

OTHER PUBLICATIONS

"Chinese Application Serial No. 201880100514.0, Voluntary Amendment Filed Oct. 14, 2021", w English Claims, 28 pgs.
(Continued)

*Primary Examiner* — Albert Decady
*Assistant Examiner* — Enam Ahmed
(74) *Attorney, Agent, or Firm* — Schwegman Lundberg & Woessner, P.A.

(57) ABSTRACT

A memory device comprises a memory array including memory cells, a communication interface to a host device, and a memory control unit operatively coupled to the memory array and the communication interface. The memory control unit is configured to store requests to access the memory in the queue, determine whether queued memory access requests are to sequential addresses of the memory array or to random addresses of the memory array, reduce an operating rate of one or more first components of the memory control unit when the queued memory access requests are to sequential addresses of the memory array, and reduce an operating rate of one or more second com-
(Continued)

ponents of the memory control unit when the queued memory access requests are to random addresses of the memory array.

20 Claims, 7 Drawing Sheets

(51) Int. Cl.
  *G06F 11/10* (2006.01)
  *G06F 13/16* (2006.01)
  *G06F 1/10* (2006.01)
(52) U.S. Cl.
  CPC ........ *G06F 3/0673* (2013.01); *G06F 11/1068* (2013.01); *G06F 13/1668* (2013.01)
(58) Field of Classification Search
  CPC ............. G06F 11/1068; G06F 13/1668; G06F 1/3225; G06F 1/3275; G06F 3/0679; G06F 13/1673; G06F 13/1689; Y02D 10/00
  USPC .......................................................... 714/764
  See application file for complete search history.

(56) References Cited

U.S. PATENT DOCUMENTS

| | | | |
|---|---|---|---|
| 11,029,883 B2 | 6/2021 | Duan et al. | |
| 2006/0123188 A1* | 6/2006 | Obinata | G11C 11/40603 711/106 |
| 2008/0092016 A1* | 4/2008 | Pawlowski | G06F 11/1044 714/E11.041 |
| 2009/0013104 A1 | 1/2009 | Nishimoto et al. | |
| 2010/0131724 A1 | 5/2010 | Miura et al. | |
| 2011/0219208 A1 | 9/2011 | Asaad et al. | |
| 2011/0238934 A1 | 9/2011 | Xu | |
| 2014/0173268 A1 | 6/2014 | Hashimoto | |
| 2014/0317469 A1* | 10/2014 | Sohn | G06F 11/1052 714/764 |
| 2014/0344597 A1 | 11/2014 | Thumma | |
| 2015/0026537 A1* | 1/2015 | Romanovskyy | G11C 11/406 714/764 |
| 2015/0206568 A1 | 7/2015 | Bose et al. | |
| 2015/0220389 A1 | 8/2015 | Kim et al. | |
| 2015/0248938 A1 | 9/2015 | Lee et al. | |
| 2015/0278014 A1* | 10/2015 | Chu | G06F 11/1068 714/764 |
| 2015/0286529 A1* | 10/2015 | Lunde | G06F 11/1048 714/764 |
| 2015/0331745 A1* | 11/2015 | Zastrow | G06F 11/1048 714/764 |
| 2016/0180920 A1 | 6/2016 | Proebsting | |
| 2018/0025776 A1 | 1/2018 | Achtenberg et al. | |
| 2018/0025777 A1 | 1/2018 | Jacobvitz et al. | |
| 2018/0074743 A1 | 3/2018 | Jeter et al. | |
| 2018/0159556 A1 | 6/2018 | Dumchin et al. | |
| 2020/0174695 A1 | 6/2020 | Bazarsky et al. | |
| 2020/0233606 A1 | 7/2020 | Duan et al. | |

FOREIGN PATENT DOCUMENTS

| | | |
|---|---|---|
| CN | 106257401 A | 12/2016 |
| CN | 113287173 | 8/2021 |
| TW | 200907678 A | 2/2009 |
| TW | 202034173 A | 9/2020 |
| TW | 729654 | 6/2021 |
| WO | WO-2020133202 A1 | 7/2020 |

OTHER PUBLICATIONS

"Chinese Application Serial No. 201880100514.0, Office Action dated Nov. 26, 2021", w English translation, 10 pgs.
"European Application Serial No. 18944768.3, Response filed Jan. 31, 2022 to Communication pursuant to Rules 161(2) and 162 EPC dated Aug. 13, 2021", 16 pgs.
U.S. Appl. No. 16/484,066, U.S. Pat. No. 11,029,883, filed Aug. 6, 2019, Reduce System Active Power Based on Memory Usage Patterns.
"International Application Serial No. PCT/CN2018/124813, International Search Report dated Oct. 9, 2019", 4 pgs.
"International Application Serial No. PCT/CN2018/124813, Written Opinion dated Oct. 9, 2019", 4 pgs.
"Taiwanese Application Serial No. 108148074, Office Action dated Oct. 13, 2020", w/ English Translation, 20 pgs.
"Taiwanese Application Serial No. 108148074, Response filed Jan. 14, 2021 to Office Action dated Oct. 13, 2020", w English Claims, 45 pgs.
"International Application Serial No. PCT CN2018 124813, International Preliminary Report on Patentability dated Jul. 8, 2021", 6 pgs.
"Chinese Application Serial No. 201880100514.0, Response filed Apr. 8, 2022 to Office Action dated Nov. 26, 2021", w/English claims, 18 pgs.
"European Application Serial No. 18944768.3, Extended European Search Report dated Jul. 20, 2022", 10 pgs.

* cited by examiner

REDUCE SYSTEM ACTIVE POWER BASED ON MEMORY USAGE PATTERNS

PRIORITY APPLICATION

This application is a continuation of U.S. application Ser. No. 16/484,066 filed Aug. 6, 2019, which is a U.S. National Stage Application under 35 U.S.C. § 371 from International Application No. PCT/CN2018/124813, filed Dec. 28, 2018, all of which are incorporated herein by reference in their entirety.

BACKGROUND

Memory devices are typically provided as internal, semiconductor, integrated circuits in computers or other electronic devices. There are many different types of memory including volatile and non-volatile memory. Volatile memory can require power to maintain data and includes random-access memory (RAM), dynamic random-access memory (DRAM), and synchronous dynamic random-access memory (SDRAM), among others. Non-volatile memory can provide persistent data by retaining stored data when not powered and can include NAND flash memory, NOR flash memory, read only memory (ROM), Electrically Erasable Programmable ROM (EEPROM), Erasable Programmable ROM (EPROM), and resistance variable memory such as phase change random access memory (PCRAM), resistive random-access memory (RRAM), and magnetoresistive random access memory (MRAM), 3D XPoint™ memory, among others.

Memory cells are typically arranged in a matrix or an array. Multiple matrices or arrays can be combined into a memory device, and multiple devices can be combined to form a storage volume of a memory system, such as a solid-state drive (SSD), a Universal Flash Storage (UFS™) device, a MultiMediaCard (MMC) solid-state storage device, an embedded MMC device (eMMC™), etc.

A memory system can include one or more processors or other memory controllers performing logic functions to operate the memory devices or interface with external systems. The memory matrices or arrays can include a number of blocks of memory cells organized into a number of physical pages. The memory system can receive commands from a host in association with memory operations, such as read or write operations to transfer data (e.g., user data and associated integrity data, such as error data and address data, etc.) between the memory devices and the host, erase operations to erase data from the memory devices, or perform one or more other memory operations.

Memory is utilized as volatile and non-volatile data storage for a wide range of electronic applications, including, for example, personal computers, portable memory sticks, digital cameras cellular telephones, portable music players such as MP3 players, movie players, and other electronic devices. Memory cells can be arranged into arrays, with the arrays being used in memory devices.

Many electronic devices include several main components: a host processor (e.g., a central processing unit (CPU) or other main processor); main memory (e.g., one or more volatile or non-volatile memory device, such as dynamic RAM (DRAM), static RAM (SRAM), mobile or low-power double-data-rate synchronous DRAM (DDR SDRAM), etc.); and a storage device (e.g., non-volatile memory (NVM) device, such as flash memory, read-only memory (ROM), an SSD, an MMC, or other memory card structure or assembly or combination of volatile and non-volatile memory etc.). In certain examples, electronic devices can include a user interface (e.g., a display, touch-screen, keyboard, one or more buttons, etc.), a graphics processing unit (GPU), a power management circuit, a baseband processor or one or more transceiver circuits, etc.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Memory devices, particularly NVM devices such as NAND flash devices, etc., can include arrays of multi-level memory cells. To program multi-level memory cells, a memory page buffer is stored with the value to be written to the memory cells. A first programming pulse is applied to the control gate of the memory cell at a voltage level that should not cause the threshold voltage of the memory cell to exceed the lowest threshold voltage of a target programmed data state of a multi-level memory cell. A read operation can then be performed to verify the threshold level to which the cell is programmed. If the cell is not programmed to the desired threshold voltage, an additional programming pulse, including optionally a higher voltage or longer length pulse, is applied and the threshold voltage is rechecked. This process is repeated until the read operation confirms that the memory cell is programmed to the desired threshold voltage.

Figure 1:
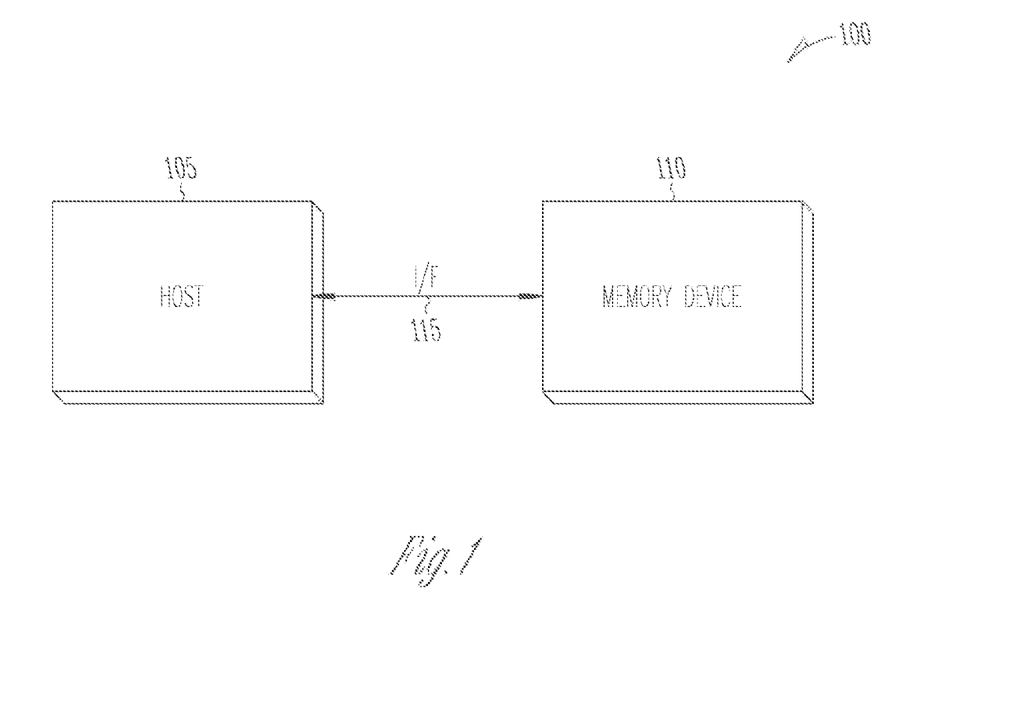
FIG. 1 illustrates an example system including a host and a memory device.

FIG. 1 illustrates an example system 100 including a host 105 and a memory device 110. The host 105 can include a host processor, a central processing unit, or one or more other device, processor, or controller. The memory device 110 can include a universal flash storage (UFS) device, an embedded MMC (eMMC™) device, or one or more other memory devices. The host 105 and the memory device 110 can communicate using a communication interface (I/F) 115 (e.g., a bidirectional parallel or serial communication interface).

In an example, the memory device 110 can include a UFS device, and the communication interface 115 can include a serial bidirectional interface, such as defined in one or more Joint Electron Device Engineering Council (JEDEC) standards (e.g., JEDEC standard D223D (JESD223D), commonly referred to as JEDEC UFS Host Controller Interface (UFSHCI) 3.0, etc.). In another example, the memory device 110 can include an eMMC™ device, and the communication interface 115 can include a number of parallel bidirectional data lines (e.g., DAT[7:0]) and one or more command lines, such as defined in one or more JEDEC standards (e.g., JEDEC standard D84-B51 (JESD84-A51), commonly referred to as JEDEC eMMC standard 5.1, etc.). In other examples, the memory device 110 can include one or more other memory devices, or the communication interface 115 can include one or more other interfaces, depending on the host 105 and the memory device 110. The identified standards are provided only as example environments in which the described methods and structures may be utilized; but such methods and structures may be utilized in a variety of environments outside of the identified standards (or of any actual or proposed standards).

Each of the host 105 and the memory device 110 can include a number of receiver or driver circuits configured to send or receive signals over the communication interface 115, or interface circuits, such as data control units, sampling circuits, or other *intermedia* circuits configured to process data to be communicated over, or otherwise process data received from the communication interface 115 for use by the host 105, the memory device 110, or one or more other circuits or devices.

The memory device 110 can include a memory array (e.g., one or more arrays of memory cells, such as a NAND flash memory array, or one or more other memory arrays) a memory control unit, and in certain examples, an interface circuit between the memory array and the memory control unit. In certain embodiments, the memory array can include a number of memory die, each having control logic separate from the memory control unit. The memory control unit can include an application specific integrated circuit (ASIC), a field programmable gate array (FPGA), or one or more other processing circuits arranged or programmed to manage data transfers or operations to, from, or within the memory array.

Figure 2:
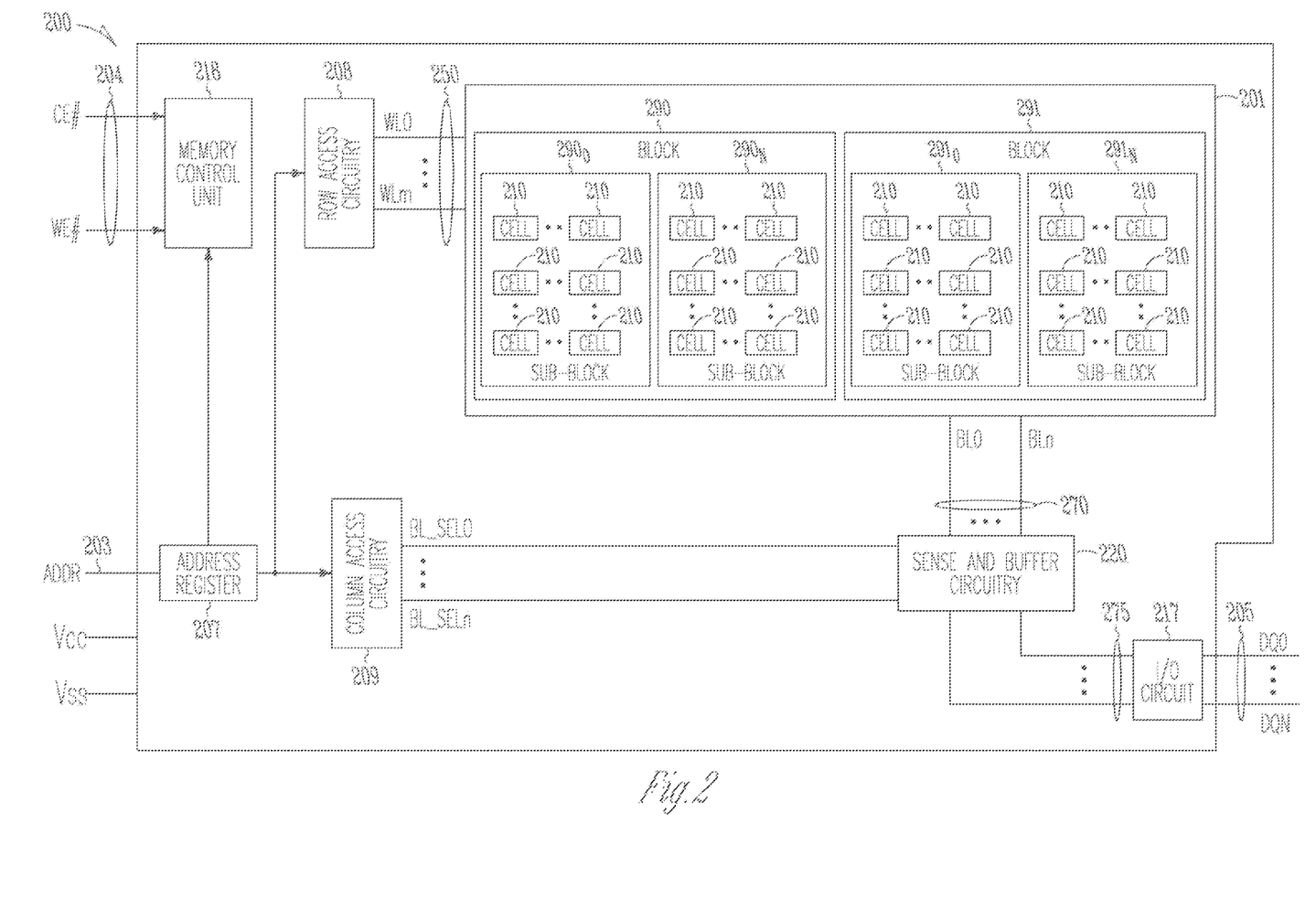
FIG. 2 is a block diagram of an apparatus in the form of a memory device including non-volatile memory cells.

FIG. 2 shows a block diagram of an apparatus in the form of a memory device 200 (e.g., memory device 110 in FIG. 1) including non-volatile memory cells having mixed memory cell types integrated in the same integrated circuit (IC) chip, according to some embodiments described herein. Memory device 200 can include a memory array (or multiple memory arrays) 201 containing memory cells 210. In the physical structure of memory device 200, memory cells 210 can be arranged vertically (e.g., stacked over each other) over a substrate of memory device 200 (e.g., a semiconductor substrate of an IC chip that includes memory device 200). Memory cells 210 can include non-volatile cells. For example, memory cells 210 can include floating gate memory cells, charge trap memory cells, ferroelectric memory cells, phase change memory cells, resistive memory cells, conduction bridge memory cells, and spin-transfer-torque magnetic random access memory (STT-MRAM) cells, or other types of non-volatile memory cells.

As shown in FIG. 2, memory cells 210 and 285 can be arranged in blocks (memory cell blocks), such as blocks 290 and 291. Each of blocks 290 and 291 can include sub-blocks. For example, block 290 can include sub-blocks $290_0$ and $290_n$ and block 291 can include sub-blocks $291_0$ and $291_n$. Each of sub-blocks $290_0$, $290_n$, $291_0$, and $291_n$ can include memory cells 210. FIG. 2 shows memory device 200 having two blocks 290 and 291 and two sub-blocks in each of the blocks as an example. Memory device 200 can have more than two blocks and more than two sub-blocks in each of the blocks.

The memory cells can be included in memory planes, Different portions of a memory die can be referred to as different planes or plane groups (e.g., a group of two or more planes can constitute a plane group) of a same die. In an illustrative example intended to be non-limiting a memory device may four memory dies with each die having two planes for a total of eight planes. Commands to the different planes of the same die may execute simultaneously. The memory cells 210 and 285 can be arranged in, for example, a number of devices, semi-conductor dies, planes, sub-blocks, blocks, or pages. More than one plane, sub-block, block, or page can be included on one memory die.

As shown in FIG. 2, memory device 200 can include access lines (which can include word lines) 250 and data lines (which can include bit lines) 270. Access lines 250 can carry signals (e.g., word line signals) WL0 through WLm. Data lines 270 can carry signals (e.g., bit line signals) BL0 through BLn. Memory device 200 can use access lines 250 to selectively access sub-blocks $290_0$, $290_n$, $291_0$, and $291_n$, of blocks 290 and 291 and data lines 270 to selectively exchange information (e.g., data) with memory cells 210 of blocks 290 and 291.

Memory device 200 can include an address register 207 to receive address information (e.g., address signals) ADDR on lines (e.g., address lines) 203. Memory device 200 can include row access circuitry 208 and column access circuitry 209 that can decode address information from address register 207. Based on decoded address information, memory device 200 can determine which memory cells 210 of which sub-blocks of blocks 290 and 291 are to be accessed during a memory operation. Memory device 200 can perform a read operation to read (e.g., sense) information (e.g., previously stored information) in memory cells 210, or a write (e.g., program) operation to store (e.g., program) information in memory cells 210. Memory device 200 can use data lines 270 associated with signals BL0 through BLn to provide information to be stored in memory cells 210 or obtain information read (e.g., sensed) from memory cells 210. Memory device 200 can also perform an erase operation to erase information from some or all of memory cells 210 of blocks 290 and 291.

Memory device 200 can include a memory control unit 218 (which can include components such as a state machine (e.g., finite state machine), register circuits, and other components) configured to control memory operations (e.g., read, write, and erase operations) of memory device 200 based on control signals on lines 204. Examples of the control signals on lines 204 include one or more clock signals and other signals (e.g., a chip enable signal CE#, a write enable signal WE#) to indicate which operation (e.g., read, write, or erase operation) memory device 200 can perform.

Memory device 200 can include sense and buffer circuitry 220 that can include components such as sense amplifiers and page buffer circuits (e.g., data latches). Sense and buffer circuitry 220 can respond to signals BL_SEL0 through BL_SELn from column access circuitry 209. Sense and buffer circuitry 220 can be configured to determine (e.g., by sensing) the value of information read from memory cells 210 (e.g., during a read operation) of blocks 290 and 291 and provide the value of the information to lines (e.g., global data lines) 275. Sense and buffer circuitry 220 can also can be configured to use signals on lines 275 to determine the value of information to be stored (e.g., programmed) in memory cells 210 of blocks 290 and 291 during a write operation) based on the values (e.g., voltage values) of signals on lines 275 (e.g., during a write operation).

Memory device 200 can include input/output (I/O) circuitry 217 to exchange information between memory cells 210 of blocks 290 and 291 and lines (e.g., I/O lines) 205. Signals DQ0 through DON on lines 205 can represent information read from or stored in memory cells 210 of blocks 290 and 291. Lines 205 can include nodes within memory device 200 or pins (or solder balls) on a package where memory device 200 can reside. Other devices external to memory device 200 (e.g., a memory controller, memory control unit, or a processor) can communicate with memory device 200 through lines 203, 204, and 205.

Memory device 200 can receive a supply voltage, including supply voltages Vcc and Vss. Supply voltage Vss can operate at a ground potential (e.g., having a value of approximately zero volts). Supply voltage Vcc can include an external voltage supplied to memory device 200 from an external power source such as a battery or alternating current to direct current (AC-DC) converter circuitry.

Each of memory cells 210 can be programmed individually or collectively to one or a number of programmed states. For example, a single-level cell (SLC) can represent one of two programmed states (e.g., 1 or 0), representing one bit of data. However, flash memory cells can also represent one of more than two programmed states, allowing the manufacture of higher density memories without increasing the number of memory cells, as each cell can represent more than one binary digit (e.g., more than one bit). Such cells can be referred to as multi-state memory cells, mufti-digit cells, or mufti-level cells (MLCs). In certain examples, MLC can refer to a memory cell that can store two bits of data per cell (e.g., one of four programmed states), a triple-level cell (TLC) can refer to a memory cell that can store three bits of data per cell (e.g., one of eight programmed states), and a quad-level cell (QLC) can store four bits of data per cell. MLC is used herein in its broader context, to refer to any memory cell that can store more than one bit of data per cell (i.e., that can represent more than two programmed states).

In another example, each of memory cells 210 can be programmed to store information representing a value for multiple bits, such as one of four possible values "00", "01", "10", and "11" of two bits, one of eight possible values "000", "001", "010", "011", "100", "101", "110", and "111" of three bits, or one of other values of another number of multiple bits. A cell that has the ability to store multiple bits is sometimes called a multi-level cell (or mufti-state cell).

Memory device 200 can include a non-volatile memory device, such that memory cells 210 and 285 can retain information stored thereon when power (e.g., voltage Vcc, Vss, or both) is disconnected from memory device 200. For example, memory device 200 can be a flash memory device, such as a NAND flash (e.g., 3-dimensional (3-D) NAND) or a NOR flash memory device, or another kind of memory device, such as a variable resistance memory device (e.g., a phase change memory device or a resistive RAM (Random Access Memory) device). One of ordinary skill in the art may recognize that memory device 200 may include other components not shown in FIG. 2 so as not to obscure the example embodiments described herein.

Figure 3:
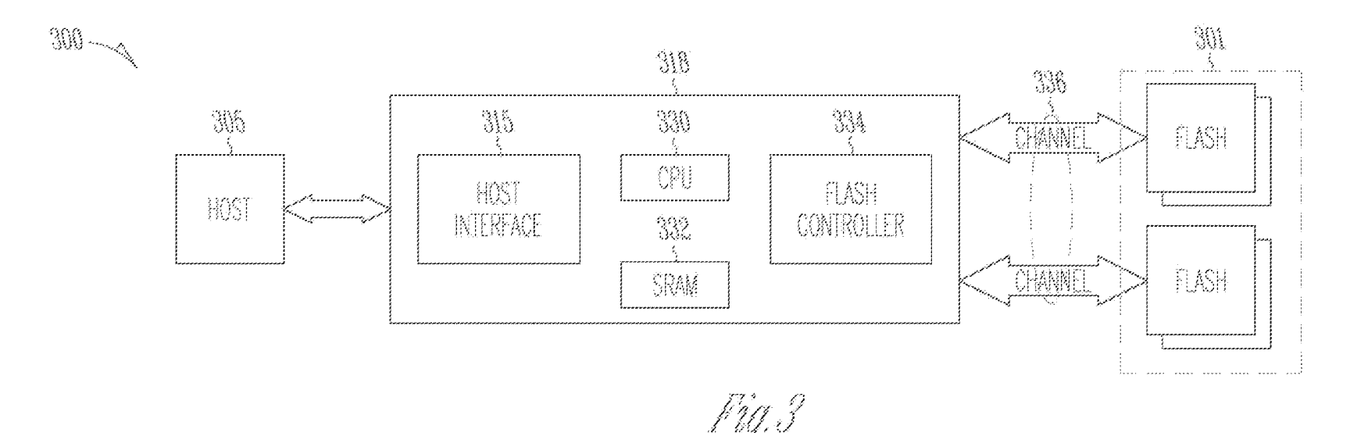
FIG. 3 is an illustration of another example system including a host and a memory device.

FIG. 3 is a block diagram of another example system including a host 305 and a memory device 300. The memory device 300 includes a memory control unit 318 and a memory array 301. The memory device 300 may be for a mobile application (mobile phone, tablet PC, etc.) and can include secure digital (SD) cards eMMC, UFS, etc. The memory device 300 may include NAND flash as the memory array 301.

The memory control unit 318 includes a communication interface 315, processor 330 (CPU), static random access memory (SRAM) 332, and a flash controller 334. The communication interface 315 is to communicate with the host 305 using a standard interface protocol, such as eMMC, or UFS. The host 305 sends commands and user data to the memory device 300 for write operations using the communication interface, and the memory device receives the user data and returns command status to the host. The command, user data, and command status are transferred according to the interface protocol. For read operations, the host device 305 sends commands to the memory device 300 and receives user data from the memory device 300.

The processor 330 may execute instructions contained in firmware to perform functions such as, among other things, handle read/write commands, manage the flash memory and initiate data transfers. SRAM 332 may be used to store firmware code and data, and to buffer data between the host and the memory array 301. The flash controller 334 communicates with the memory array 301 via bus 336 (e.g., a NAND flash bus using a double data rate, or DDR, interface). The flash controller 334 sends flash commands, sends write data, and receives read data using the bus.

For a mobile storage device, there are several metrics, such as performance, reliability, endurance, power, etc., that strengthen the place of the device in the market. For mobile computing devices (e.g., smartphones, tablet computers and laptop computers) lengthening the time between charges of the battery is challenging as the devices become more sophisticated. Because of this, a storage device with lower power consumption is more attractive to manufacturers of mobile computing devices. Therefore, developing a low power consumption storage device is one critical target for mobile storage device providers.

Power consumed by an electronic device can include active power and idle power. Active power refers to the power consumption when the device is working, while idle power refers to the power consumption when the electronic device is idle. Measures can be taken to reduce the active power and idle power consumption. For example, electronic devices can include a lower power consumption storage controller and flash memory to reduce the active power, and the electronic device can be designed to enter low power mode when the device is idle.

For the low power mode, the device automatically turns off the power to most of the device parts when there is no host command and enters a hibernate mode or sleep mode. This low power mode can dramatically reduce the idle power, and the overall power consumed by the electronic device. Reducing the active power can be a greater challenge. High system performance and low power are both important targets for device vendors. However, higher performance of the electronic device normally means higher active power for the electronic device.

An approach to reducing active power includes dynamically controlling the active power of the storage device based on memory usage patterns. Four main types of memory usage patterns include sequential reads to memory, sequential writes, random reads to memory, and random writes. The read and write commands have a command chunk size that is the number of bytes of data the command will read or write. A random memory access request (write or read) may include one logical address that references one block of memory data for access. For random write and random read, the command chunk size is normally small (e.g., 4 KB or 8 KB).

A sequential memory access request (write or read) references multiple blocks of data. The blocks of data may be in contiguous logical address space. The sequential access request may include one logical address (e.g., a base address) or a range of logical addresses for the access request. For sequential write and read, the command chunk size is larger (e.g., 128 kilobytes (128 KB) to 512 KB) and sequential write and read can require a high throughput for the device interface and memory bus. For random write and random read, the demand on the device interface and memory bus is less because the command chunk size is smaller.

Figure 4:
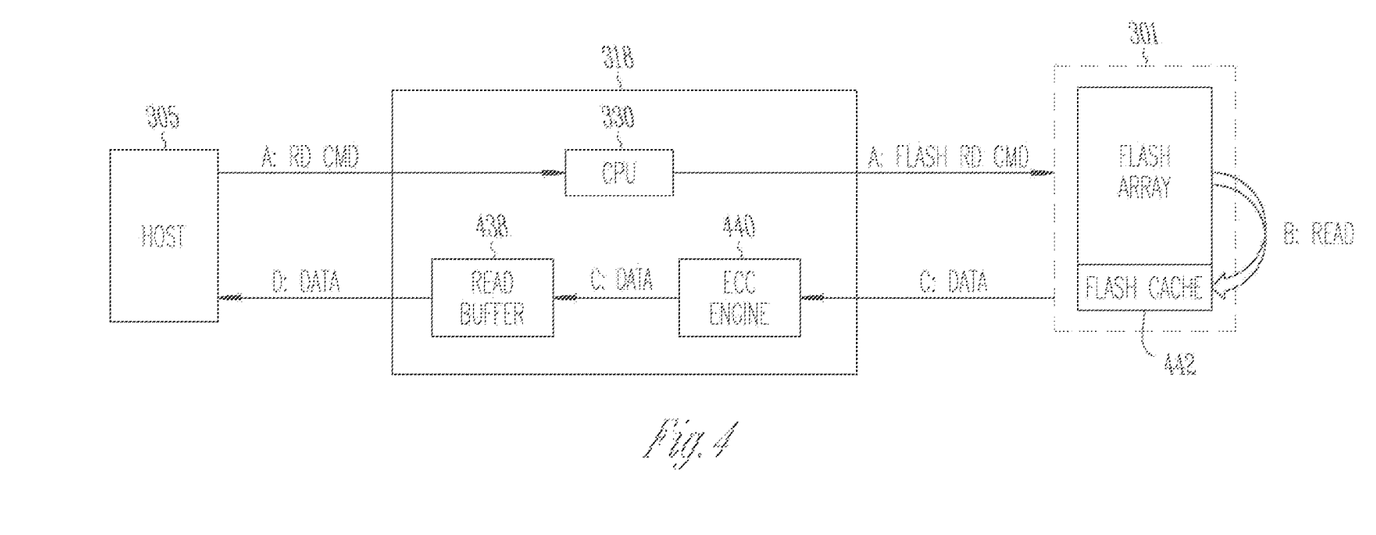
FIG. 4 is a block diagram of an example of a host and a memory device showing a read path through the memory device.

FIG. 4 is a block diagram of the host 305 and memory device of FIG. 3 showing a read path through the memory control unit 318 and memory array 301. The communication interface and flash controller are omitted in the block diagram. The read data path can include a read buffer 438 and an error correction code (ECC) circuitry such as an ECC engine 440. An "engine" refers to a block logic circuitry of the memory control unit 318 dedicated to performing ECC functions (e.g., Bose, Chaudhuri, and Hocquenghem (BCH) coding and decoding, or low density parity coding (LDPC) and decoding). Using dedicated logic circuitry offloads the ECC functions from the processor 330. ECC is used to correct the error data of the memory array 301. On the read path, the ECC engine 440 checks and corrects the error bits using ECC parity. The read buffer holds the corrected data transfer to the host 305. The memory control unit 318 may include a direct memory access (DMA) engine (not shown) to transfer data from memory cache 442 to the read buffer 438 and from the read buffer 438 to the host 305.

The memory device 300 may perform a series of steps to handle a host read command. First, in step A, the firmware of the processor 330 receives and parses the read command, and then sends a read request to the memory array 301. In step B, the read request is executed, and data is transferred to the memory cache 442. In step C, the data is then transferred from the memory cache 442 to the read buffer 438 with ECC checking. Finally, in step D, the data is transferred from the read buffer 438 to the host 305.

Figure 5:
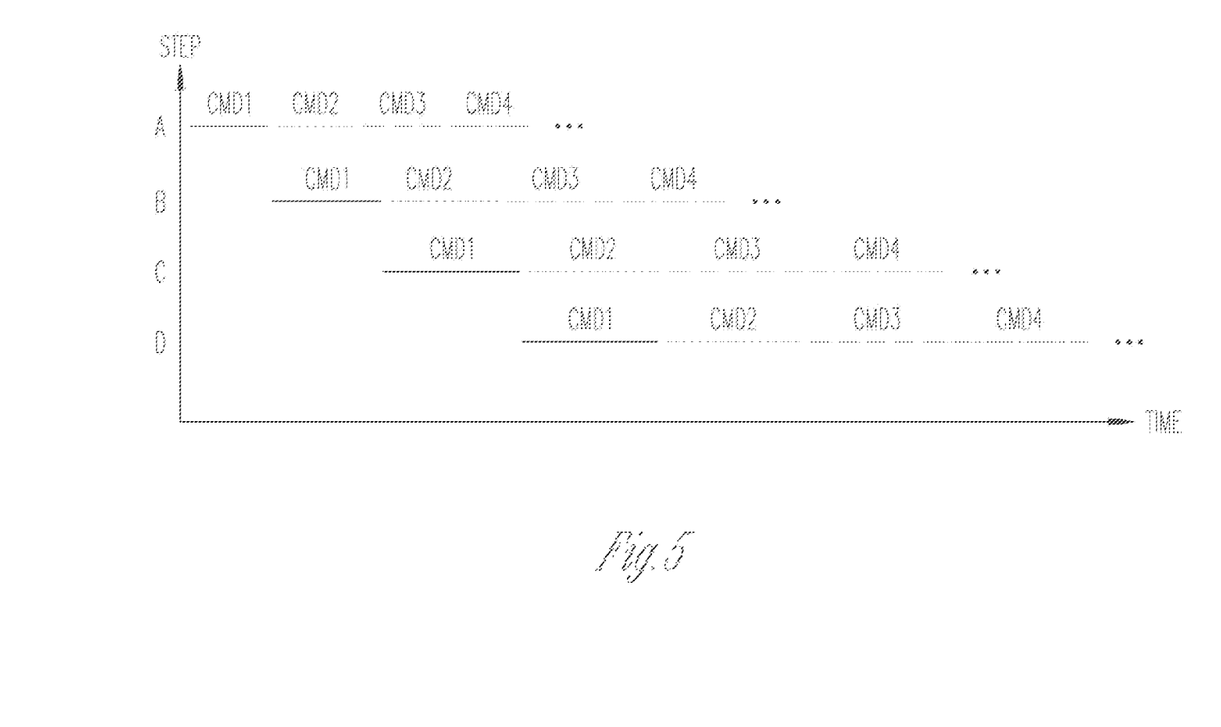
FIG. 5 is an illustration of an example of a pipeline to handle memory commands.

The storage protocol (e.g., UFS protocol) may support a command queue to store multiple read commands that can be processed simultaneously as a pipeline of host read commands. FIG. 5 is an illustration of an example of a pipeline to handle read commands. In the example, four read commands are queued in the pipeline and steps A through D of the read commands are executed at different stages of the pipeline.

If it takes time $t_A$, $t_B$, $t_C$, $tD$ to execute steps A, B, C, D, respectively, then the read performance of a read command is Read Performance=[read command chunk size]/max $[t_A, t_B, t_C, t_D]$.

This means the read performance is limited by the slowest step of the four read steps.

The time needed to execute step A ($t_A$) mostly depends on the speed of the processor 330. The faster the processor, the faster the processor firmware will handle the read command. The time to execute step B ($t_B$) depends on the memory read performance (e.g., a flash read time). The time to execute step C ($t_C$) depends on the transfer rate of the bus 336 and the decoding speed of the ECC engine 440. The time to execute step D ($t_D$) depends on the speed of the communication interface 315 between the host 305 and the memory control unit 318.

Active power consumption can be improved if certain steps of the read command can be slowed down without affecting read performance. In other words, the memory device can take advantage of a read command bottle neck process by slowing the other processes of the read command as long as the slowing doesn't increase the bottle neck or otherwise reduce the overall read performance. If one of steps A, B, C, or D is a bottleneck for the read command, the other steps may offer an opportunity for slowing down to reduce active power. In general, once the memory (e.g., type of flash) and the communication interface 315 (e.g., type of protocol) are decided for a storage device, the time for the memory read access (4) and the time for a transfer via the communication interface ($t_D$) are set and the processor or the firmware can't dynamically change ($t_B$) or ($t_D$). However, time $t_A$ can be adjusted by changing the speed of the processor, and time $t_C$ can be adjusted by changing the speed of one or both of the ECC decoder and the memory bus.

For example, if the read performance is limited by the memory performance ($t_B$) or the communication interface speed ($t_D$), the firmware can reduce active power by lengthening time $t_A$ by lowering the operating frequency of the processor, or by lengthening time $t_C$ by reducing the frequency of the clock provided to the KC decoder or reducing the transfer rate of the bus. The memory control unit may include a controller, such as flash controller 334 in FIG. 3, that communicates with the memory array via the bus. The firmware can reduce the transfer rate of the bus by reducing the operating rate of the controller.

As explained previously herein, read commands can include sequential reads and random reads. Good read performance for sequential reads requires high data throughput which depends on the speed of the communication interface, the ECC decoding, and the transfer rate of the bus 336. The performance of the processor 330 won't be the performance bottleneck of a sequential read, so active power can be reduced by lowering the CPU frequency and lengthening time $t_A$ when a sequential read usage pattern is detected.

However, for random reads, the performance normally depends on how fast the firmware can handle a read command which depends on the performance of the processor. The speed of the ECC decoding and the transfer rate of the bus won't be the performance bottle neck of the random read, so active power can be reduced by lengthening time $t_C$ by one or both of slowing down the ECC decoding and data transfer rate of the bus.

To summarize, the active power for sequential read commands can be reduced by lengthening time $t_A$, and performance shouldn't be affected if times $t_B$, $t_C$, and $t_D$ are maintained. The active power for random read commands can be reduced by lengthening time $t_C$, and performance shouldn't be affected if times $t_A$, $t_B$, and $t_D$ are maintained.

Figure 6:
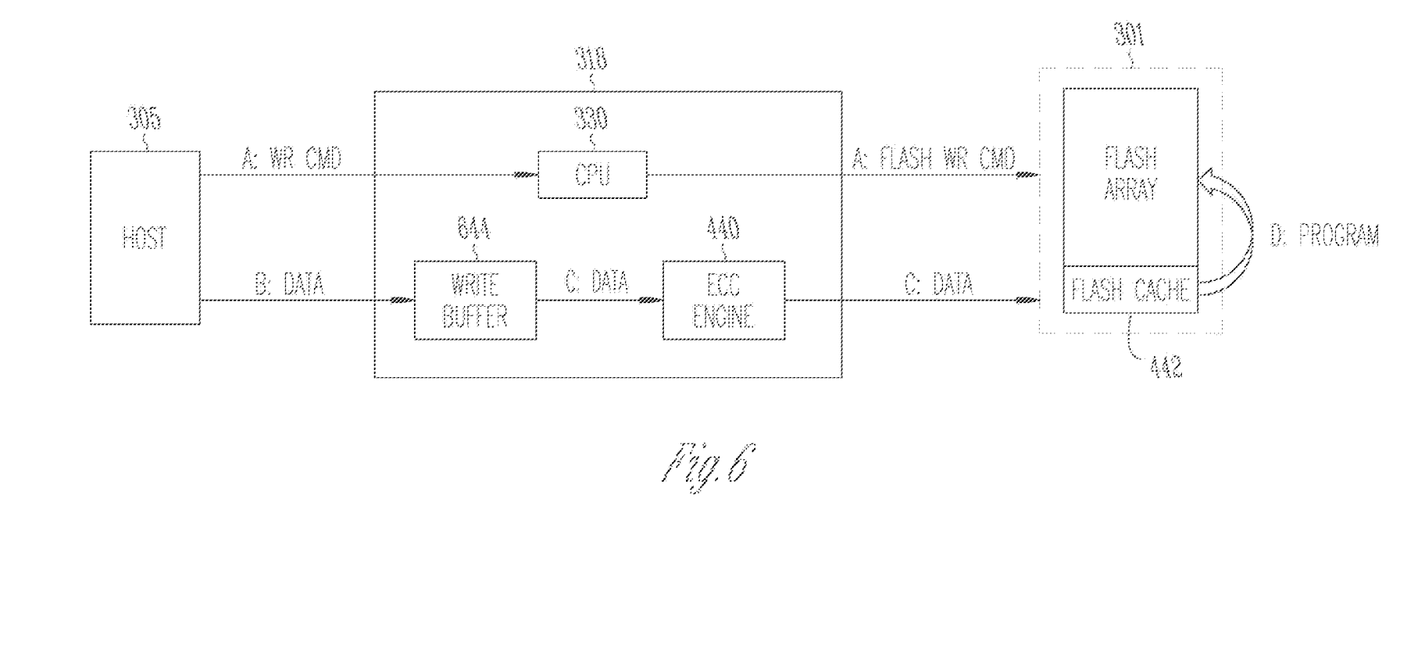
FIG. 6 is a block diagram of an example of a host and a memory device showing a write path through the memory device.

The analysis for write commands is similar to the analysis for read commands. FIG. 6 is a block diagram of the host 305 and memory device of FIG. 3 showing a write path through the memory control unit 318 and memory array 301. The write path can include a write buffer 644 and the ECC engine 440. The memory device 300 may perform a series of steps to handle a host write command. First, in step A, the firmware of the processor 330 receives and parses the write command. In step B, the write data is transferred from the host and stored in the write buffer 644. The data may be transferred across the communication interface to the write buffer 644 using the DMA engine. In step C, the write data is then transferred to the memory cache 442 from the write buffer 438 with ECC encoding. Finally, in step D the data in memory cache 442 is programmed into the memory array.

As with read commands, the storage protocol may support a command queue to store multiple write commands that can be processed simultaneously as a pipeline of host read commands. Conceptually, a pipeline to handle the write commands looks the same as the pipeline illustrated in FIG. 5 to handle read commands. Write commands are queued in the pipeline and steps A through D of the write commands are executed at different stages of the pipeline.

If it takes time $t_A$, $t_B$, $t_C$, $t_D$) to execute steps A, B, C, D, respectively, then the write performance of a write command is Write Performance=[write command chunk size]/ max[$t_A,t_B,t_C,t_D$].

As with the read performance, the write performance is limited by the slowest step of the four write steps.

The time needed to execute step A ($t_A$) mostly depends on the speed of the processor 330. The faster the processor, the faster the processor firmware will handle the write command. The time to execute step B ($t_B$) depends on the speed of the communication interface between the host 305 and the memory device. The time to execute step C ($t_C$) depends on the transfer rate of the bus 336 and the encoding speed of the ECC engine 440. The time to execute step D ($t_D$) depends on the memory write performance (e.g., a flash programming time).

Once the memory and the communication interface are decided upon for a storage device the time for the communication interface transfer ($t_B$) and the time for the memory programming ($t_D$) are set and the processor or the firmware can't dynamically change time $t_B$ car $t_D$. However, time $t_A$ can be adjusted by changing the speed of the processor, and time $t_C$ can be adjusted by changing the speed of one or both of the ECC decoder and the memory bus. For example, if the write performance is limited by the flash performance ($t_D$) or the host interface speed ($t_B$), firmware can reduce the active power by lowering the operating frequency of the processor (thereby lengthening time $t_A$), or by reducing one or both of the ECC encoding speed and the transfer rate from the write buffer to the memory (thereby lengthening time $t_C$).

Write commands can include sequential writes and random writes. Good performance for sequential writes requires high data throughput which depends on the speed of the communication interface, the ECC encoding, and the transfer rate of the memory bus 336. The performance of the processor 330 won't be the performance bottleneck of a sequential write, so active power can be reduced by lowering the CPU frequency and lengthening time $t_A$ when a sequential write usage pattern is detected.

However, for random writes, the performance normally depends on how fast the firmware can handle a write command, which depends on the performance of the processor 330. The speed of the ECC encoding and the transfer rate of the memory bus won't be the performance bottle neck of the random write, so active power can be reduced by lengthening time $t_C$ by slowing down one or both of the ECC encoding and data transfer rate of the bus.

To summarize, the active power for sequential write commands can be reduced by lengthening time $t_A$, and performance shouldn't be affected if times $t_B$, $t_C$, and $t_D$ are maintained. The active power for random write commands can be reduced by lengthening time $t_C$, and performance shouldn't be affected if times $t_A$, $t_B$, and $t_D$ are maintained. This analysis for write commands shows that the same components can be slowed for both sequential read commands and sequential write commands without negatively impacting performance, and the same components can be slowed for both random read commands and random write commands.

Figure 7:
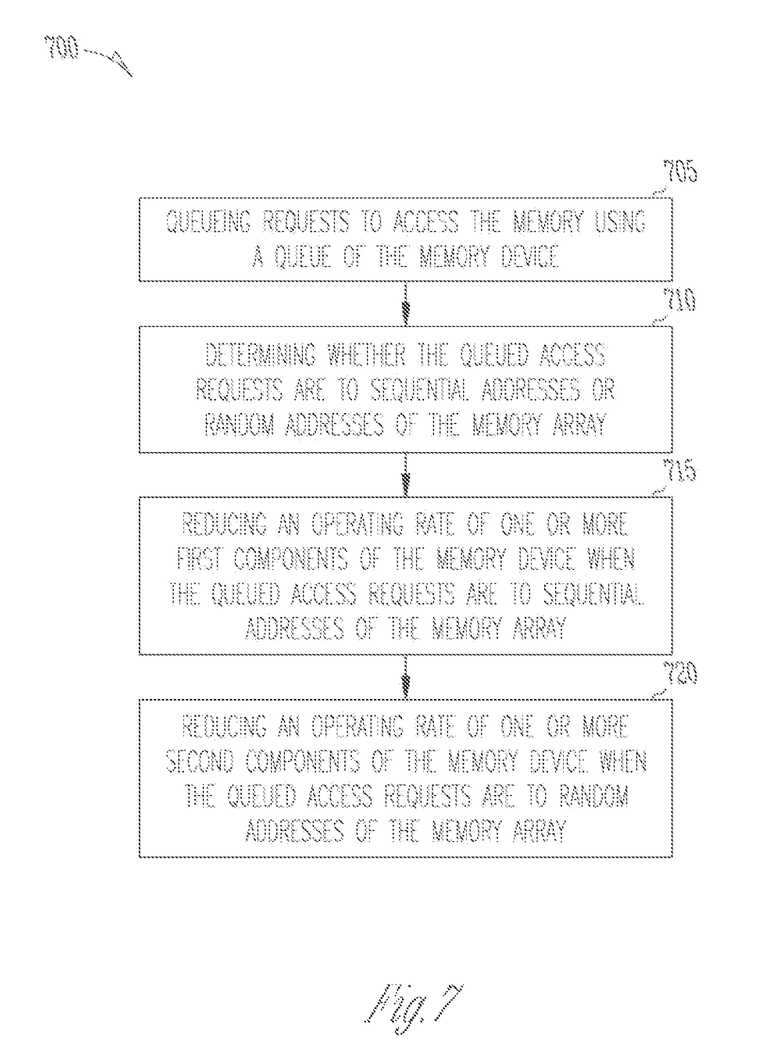
FIG. 7 is a flow diagram of a method of operating a memory device.

FIG. 7 is a flow diagram of a method 700 of operating a memory device, such as the memory device 200 of FIG. 2. The memory device includes a memory array 201, a communication interface 215 and a memory control unit 218. At 705, requests to access the memory are queued or stored using a command queue of the memory control unit. The command queue may be a command pipeline as illustrated in FIG. 5. At 710, the memory usage pattern of the commands is determined. The queue may be a read command queue or a write commend queue, and the memory control unit determines whether the queued memory access requests are to sequential addresses of a memory array or to random addresses of the memory array.

In some examples, the memory control unit determines whether the queued memory access requests are sequential or random addresses using the address field included in the access requests. In some examples, the memory control unit determines whether the queued memory access requests are sequential or random addresses using a command word included in the access requests. The memory access requests may include a different value of a command word for each of sequential reads to memory, sequential writes, random reads to memory and random writes. The memory control unit determines the memory usage pattern using the command word. In some examples, the memory control unit uses the command chunk size to determine whether the queued memory access requests are sequential or random addresses. As explained previously herein, the command chunk size for sequential memory access requests is much larger (e.g., 128 KB-512 KB) than for random memory access requests (e.g., 4 KB-8 KB). The difference in command chunk size can indicate whether the memory access request is a sequential or random address request.

Sequential memory access requests may also be identified from the address range of the request. The memory control unit may determine that a memory access request is a sequential memory access request when the memory access request is to more than threshold number of contiguous memory addresses or memory pages. Alternatively, or in addition to the sequential memory access identification, the memory control unit may identify random memory accesses when the memory addressed is not contiguous, or contiguous but less than a threshold number of memory addresses or memory pages.

At 715, the operating rates of one or more first components of the memory device are reduced when the queued access requests are to sequential addresses of the memory array. At 720, the operating rates of one or more second components of the memory device are reduced when the queued access requests are to random addresses of the memory array. The memory control unit may include a processor as one of the first components. The memory control unit may reduce the operating rate of the processor when the queued access requests are to sequential addresses of the memory array. The access requests may be either sequential read requests or sequential write requests. The memory control unit may include logic circuitry to reduce the operating rate by reducing the frequency of the clock signal provided to operate the processor. The frequency can be reduced as long as the slower operation of the processor does not impact the overall performance. The lower limit of the frequency would be the point where slowing the parsing of the read/write commands and sending the access requests to the memory array begins to create a new bottle neck of performance of sequential address requests.

The memory control unit may include error correction code (ECC) circuitry (e.g., an ECC encoding/decoding engine) one of the second components. The memory control unit may reduce the operating rate of the KC circuitry by reducing a frequency of a clock signal of the ECC circuitry when the queued memory access requests are to random addresses of the memory array. The memory control unit may include a controller (e.g., a flash controller) as one of the second components. The controller controls the transfer of data to and from the memory array using the bus. The memory control unit may reduce the transfer rate of the bus by reducing a frequency of the clock signal of the flash controller when the queued memory access requests are to random addresses of the memory array. Again, the lower limit of the frequency would be the point where slowing the frequency of the clock signal of the flash controller causes the transfer rate of the memory bus to become the performance bottle neck.

To maintain performance of the read and write commands, the operating rate is maintained for the components that are not selected for rate reduction. For example, when the memory access requests are to sequential addresses, the memory control unit may reduce the frequency of the clock signal of the processor while maintaining the frequency of the clock signal of the flash controller. Similarly, when the memory access requests are to random addresses, the memory control unit may reduce the frequency of the clock signal of the flash controller and maintain the frequency of the clock signal of the processor.

Normally, performance and active power are tradeoffs in the design of an electronic system. Increasing performance means more active power and lower active power means less performance. The methods, systems, and devices described herein reduce the active power of an electronic device or system without reducing performance. The components that are a performance bottle neck of a particular operation are determined, and the components that are not part of the bottle neck are slowed down.

Figure 8:
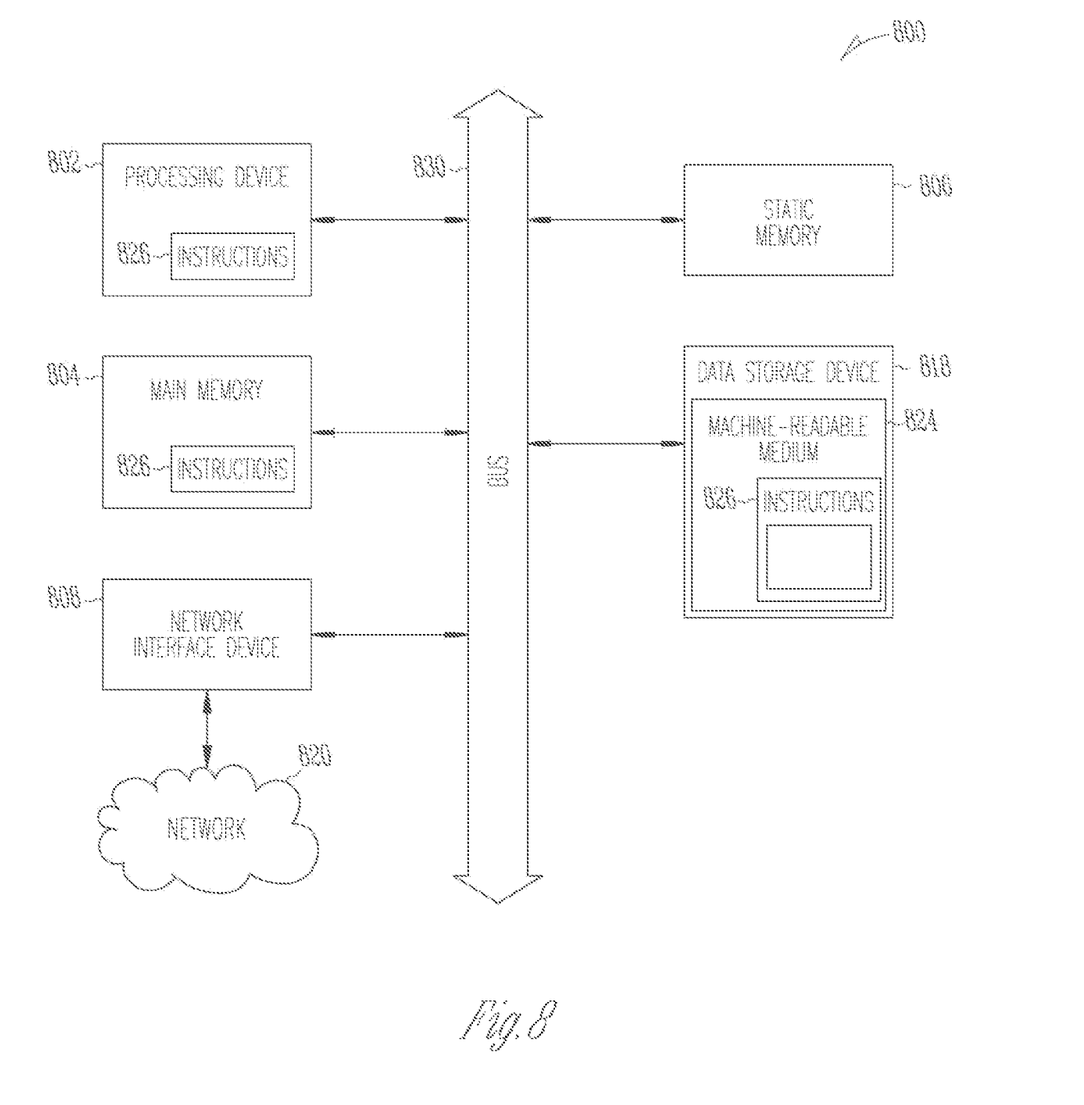
FIG. 8 illustrates a block diagram of an example machine according to some embodiments described herein.

FIG. 8 illustrates a block diagram of an example machine 800 upon which any one or more of the techniques (e.g., methodologies) discussed herein may perform, such as the described discard and purge operations for example. In alternative embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environment. The machine 800 may be a personal computer (PC), a tablet PC, a set-top box (STB), a personal digital assistant (PDA), a mobile telephone, a web appliance, an IoT device, automotive system, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The embodiments and examples, as described herein, may include, or may operate by, logic, components, devices, packages, or mechanisms. Circuitry is a collection (e.g., set) of circuits implemented in tangible entities that include hardware (e.g., simple circuits, gates, logic, etc.). Circuitry membership may be flexible over time and underlying hardware variability. Circuitries include members that may, alone or in combination, perform specific tasks when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, moveable placement of invariant massed particles, etc.) to encode instructions of the specific operation. In connecting the physical components, the underlying electrical properties of a hardware constituent are changed for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

The machine (e.g., computer system) 800 (e.g., the host 105, the memory device 110 of FIG. 1, etc.) may include a processing device 802 (e.g., a hardware processor, a central processing unit (CPU), a graphics processing unit (GPU), a hardware processor core, or any combination thereof, such as a memory control unit of the memory device 110, etc.), a main memory 804 (e.g., read-only memory (ROM), flash memory, dynamic random-access memory (DRAM) such as synchronous DRAM (SDRAM) or Rambus DRAM (RDRAM), etc.), a static memory 806 (e.g., flash memory, static random-access memory (SRAM), etc.), and a data storage system 818, some or all of which may communicate with each other via an interlink (e.g., bus) 830.

The processing device 802 can represent one or more general-purpose processing devices such as a microprocessor, a central processing unit, or the like. More particularly, the processing device 802 can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 802 can also be one or more special-purpose processing devices such as an application specific integrated circuit (ASIC), a field programmable gate array (FPGA), a digital signal processor (DSP), network processor, or the like. The processing device 802 can be configured to execute instructions 826 for performing the operations and steps discussed herein. The machine 800 can further include a network interface device 808 to communicate over a network 820.

The data storage system 818 can include a machine-readable storage medium 824 (also known as a computer-readable medium) on which is stored one or more sets of instructions 826 or software embodying any one or more of the methodologies or functions described herein. The instructions 826 can also reside, completely or at least partially, within the main memory 804 or within the processing device 802 during execution thereof by the machine 800, the main memory 804 and the processing device 802 also constituting machine-readable storage media. The machine-readable storage medium 824, the data storage system 818, or the main memory 804 can correspond to the memory device 110 of FIG. 1. In one implementation, the instructions 826 include instructions 811 to implement functionality corresponding to reducing the operating rate of one or more components according to memory usage patterns.

While the machine-readable storage medium 824 is shown in an example implementation to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media. In an example, a massed machine-readable medium comprises a machine-readable medium with a plurality of particles having invariant (e.g., rest) mass. Accordingly, massed machine-readable media are not transitory propagating signals. Specific examples of massed machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The machine 800 may further include a display unit, an alphanumeric input device (e.g., a keyboard), and a user interface (UI) navigation device (e.g., a mouse). In an example, one or more of the display unit, the input device, or the UI navigation device may be a touch screen display. The machine a signal generation device (e.g., a speaker), or one or more sensors, such as a global positioning system (GPS) sensor, compass, accelerometer, or one or more other sensor. The machine 800 may include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.)

The instructions 826 (e.g., software, programs, an operating system (OS), etc.) or other data are stored on the data storage device 818 can be accessed by the main memory 804 for use by the processing device 802. The main memory 804 (e.g., DRAM) is typically fast, but volatile, and thus a different type of storage than the data storage device 818 (e.g., an SSD), which is suitable for long-term storage, including while in an "off" condition. The instructions 826 or data in use by a user or the machine 800 are typically loaded in the main memory 804 for use by the processing device 802. When the main memory 804 is full virtual space from the data storage device 818 can be allocated to supplement the main memory 804; however, because the data storage device 818 device is typically slower than the main memory 804, and write speeds are typically at least twice as slow as read speeds, use of virtual memory can greatly reduce user experience due to storage device latency (in contrast to the main memory 804, e.g., DRAM). Further, use of the data storage device 818 for virtual memory can greatly reduce the usable lifespan of the data storage device 818.

In contrast to virtual memory, virtual memory compression (e.g., the Linux™ kernel feature "ZRAM") uses part of the memory as compressed block storage to avoid paging to the data storage device 818. Paging takes place in the compressed block until it is necessary to write such data to the data storage device 818. Virtual memory compression increases the usable size of the main memory 804, while reducing wear on the data storage device 818.

Storage devices optimized for mobile electronic devices, or mobile storage, traditionally include MMC solid-state storage devices (e.g., micro Secure Digital (microSD™) cards, etc.). MMC devices include a number of parallel interfaces (e.g., an 8-bit parallel interface) with a host (e.g., a host device), and are often removable and separate components from the host. In contrast, eMMC™ devices are attached to a circuit board and considered a component of the host, with read speeds that rival serial ATA™ (Serial AT (Advanced Technology) Attachment, or SATA) based SSD devices. However, demand for mobile device performance continues to increase, such as to fully enable virtual or augmented-reality devices, utilize increasing networks speeds, etc. In response to this demand, storage devices have shifted from parallel to serial communication interfaces. Universal Flash Storage (UFS) devices, including controllers and firmware, communicate with a host using a low-voltage differential signaling (LVDS) serial interface with dedicated read/write paths, further advancing greater read/write speeds.

The instructions 824 may further be transmitted or received over a network 820 using a transmission medium via the network interface device 808 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 808 may include one or more physical jacks (e.g., Ethernet, coaxial, or phone jacks) or one or more antennas to connect to the network 820. In an example, the network interface device 808 may include a plurality of antennas to wirelessly communicate using at least one of single-input multiple-output (SIMM), multiple-input multiple-output (MIMO), or multiple-input single-output (MISO) techniques. The term "transmission medium" shall be taken to include any intangible medium that is capable of storing, encoding, or carrying instructions for execution by the machine 800, and includes digital or analog communications signals or other intangible medium to facilitate communication of such software.

The above detailed description includes references to the accompanying drawings, which form a part of the detailed description. The drawings show, by way of illustration, specific embodiments in which the invention can be practiced. These embodiments are also referred to herein as "examples". Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, unless stated otherwise the term "or" is used to refer to a nonexclusive or, such that "A or B" may include "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended. A system, device, article, or process that includes elements in addition to those listed after such a term in a claim are still deemed to fall within the scope of that claim. Moreover, in the following claims, the terms "first" "second," and "third," etc. are used merely as labels, and are not intended to impose numerical requirements on their objects.

In various examples, the components, controllers, processors, units, engines, or tables described herein can include among other things, physical circuitry or firmware stored on a physical device. As used herein, "processor" means any type of computational circuit such as, but not limited to, a microprocessor, a microcontroller, a graphics processor a digital signal processor (DSP), or any other type of processor or processing circuit, including a group of processors or multi-core devices.

Operating a memory cell, as used herein, includes reading from, writing to, or erasing the memory cell. The operation of placing a memory cell in an intended state is referred to herein as "programming," and can include both writing to or erasing from the memory cell (e.g., the memory cell may be programmed to an erased state).

According to one or more embodiments of the present disclosure, a memory controller (e.g., a processor, controller, firmware, etc.) located internal or external to a memory device, is capable of determining (e.g., selecting, setting, adjusting, computing, changing, clearing, communicating, adapting, deriving, defining, utilizing, modifying, applying, etc.) quantity of wear cycles, or a wear state (e.g., recording wear cycles, counting operations of the memory device as they occur, tracking the operations of the memory device it initiates, evaluating the memory device characteristics corresponding to a wear state, etc.)

According to one or more embodiments of the present disclosure, a memory access device may be configured to selectively reduce the operating rate of one or more components to reduce active power. The memory device control circuitry (e.g., control logic) may be programmed to slow the clock signal provided to the components in response to determining the type of memory accesses (e.g., memory usage patterns) that are being performed by the memory access device.

Method examples described herein can be machine, device, or computer-implemented at least in part. Some examples can include a computer-readable medium, a device-readable medium, or a machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact discs and digital video disks), magnetic cassettes, memory cards or sticks, random access memories (RAMs), read only memories (ROMs), solid state drives (SSDs), Universal Flash Storage (UFS) device, embedded MMC (eMMC) device, and the like.

ADDITIONAL DESCRIPTION AND EXAMPLES

Example 1 includes subject matter (such as a memory device) comprising a memory array including memory cells; a communication interface configured for communicating with a host; and a memory control unit operatively coupled to the memory array and the communication interface and including a queue. The memory control unit is configured to: store requests to access the memory in the queue; determine whether queued memory access requests are to sequential addresses of the memory array or to random addresses of the memory array; reduce an operating rate of one or more first components of the memory control unit when the queued memory access requests are to sequential addresses of the memory array; and reduce an operating rate of one or more second components of the control unit when the queued memory access requests are to random addresses of the memory array.

In Example 2 the subject matter of Example 1, optionally includes a memory control unit including a processor configured to process the requests to access the memory. The memory control unit is configured to reduce a frequency of a clock signal of the processor when the queued memory access requests are to sequential addresses of the memory array.

In Example 3, the subject matter of one or both of Examples 1 and 2 optionally include a bus configured to transfer data between the memory control unit and memory array. The memory control unit optionally includes a flash controller to transfer data using the bus and the memory control unit is configured to reduce a frequency of a clock signal of the flash controller when the queued memory access requests are to random addresses of the memory array.

In Example 4, the subject matter of one or any combination of Examples 1-3 optionally includes a memory control unit including error correction code (ECC) circuitry and the memory control unit is configured to reduce a frequency of a clock signal of the ECC circuitry when the queued memory access requests are to random addresses of the memory array.

In Example 5, the subject matter of one or any combination of Examples 1-4 optionally includes a bus configured to transfer data between the memory control unit and memory array and a memory control unit including a flash controller to transfer data using the bus and a processor configured to process the requests to access the memory. The memory control unit is configured to: reduce a frequency of a clock signal of the processor and maintain a frequency of a clock signal of the flash controller when the queued memory access requests are to sequential addresses of the memory array, and maintain a frequency of a dock signal of the processor and reduce a frequency of a clock signal of the flash controller when the queued memory access requests are to random addresses of the memory array.

In Example 6 the subject matter of one or any combination of Examples 1-5 optionally includes the queued memory access requests including memory write requests.

In Example 7 the subject matter of one or any combination of Examples 1-5 optionally includes the queued memory access requests including memory read requests.

Example 8 includes subject matter (such as a method of operating a memory device or can optionally be combined with ne or any combination of Examples 1-7 to include such subject matter, comprising queueing requests to access the memory using a command queue of the memory device; determining whether the queued access requests are to sequential addresses of a memory array or to random addresses of the memory array; reducing an operating rate of one or more first components of the memory device when the queued access requests are to sequential addresses of the memory array; and reducing an operating rate of one or more second components of the memory device when the queued access requests are to random addresses of the memory array.

In Example 9 the subject matter of Example 8 optionally includes the one or more first components including a processor of the memory device configured to process the requests to access the memory.

In Example 10, the subject matter of one or both of Examples 8 and 9 optionally include the one or more second components including one or more of error correction code (ECC) circuitry of the memory device and a flash controller of the memory device, the flash controller configured to transfer memory write data and memory read data using a bus.

In Example 11, the subject matter of one or any combination of Examples 8-10 optionally includes maintaining the operating rate of the one or more second components of the memory device when the queued access requests are to sequential addresses of the memory array; and maintaining the operating rate of the one or more first components of the memory device when the queued access requests are to random addresses of the memory array.

In Example 12 the subject matter of one or any combination of Examples 8-12 optionally includes reducing a frequency of a clock signal of the one or more first components and maintaining a frequency of a clock signal of the one or more second components when the queued access requests are to sequential addresses of the memory array; and reducing a frequency of a clock signal of the one or more second components and maintaining a frequency of a clock signal of the one or more first components when the queued access requests are to random addresses of the memory array.

In Example 13 the subject matter of one or any combination of Examples 8-12 optionally includes the requests to access the memory including memory write requests.

In Example 14, the subject matter of one or any combination of Examples 842 optionally includes the requests to access the memory including memory read requests.

In Example 15, the subject matter of one or any combination of Examples 8-14 optionally includes determining whether queued access requests are to sequential addresses or random addresses using a command word included in the access requests.

In Example 16, the subject matter of one or any combination of Examples 845 optionally includes determining whether queued access requests are to sequential addresses or random addresses using a command chunk size of the access requests.

Example 17 includes subject matter (or can optionally be combined with one or any combination of Examples 1-16 to include such subject matter), such as a computer readable storage medium comprising instructions configured to cause a memory control unit of a memory device to perform acts including: queue requests to access the memory using a queue of the memory device; determine whether the queued access requests are to sequential addresses of a memory array or to random addresses of the memory array; reduce an operating rate of one or more first components of the memory device when the queued access requests are to sequential addresses of the memory array; and reduce an operating rate of one or more second components of the memory device when the queued access requests are to random addresses of the memory array. The computer readable medium may be a non-transitory computer readable medium.

In Example 18, the subject matter of claim 17 optionally includes instructions configured to cause the memory control unit to reduce an operating rate of a processor of the memory control unit when the queued access requests are to sequential addresses of the memory array.

In Example 19, the subject matter of one or both of claims 17 and 18 optionally include instructions configured to cause the memory control unit to reduce an operating rate of one or more of error correction code (ECC) circuitry and a flash controller of the memory control unit when the queued access requests are to random addresses of the memory array.

In Example 20, the subject matter of one or any combination of Examples 17-19 optionally includes instructions configured to cause the memory control unit to reduce a frequency of a dock signal of the one or more first components and maintain a frequency of a dock signal of the one or more second components when the queued access requests are to sequential addresses of the memory array; and reduce a frequency of a dock signal of the one or more second components and maintain a frequency of a dock signal of the one or more first components when the queued access requests are to random addresses of the memory array.

Example 21 includes subject matter (such as a memory device) or can optionally be combined with one or any combination of Examples 1-20 to include such subject matter, comprising a memory array including memory cells; a communication interface configured for communicating with a host; and a memory control unit operatively coupled to the memory array and the communication interface, and including a queue. The memory control unit is configured to: store requests to access the memory in the queue; determine whether queued memory access requests are to sequential addresses of the memory array or to random addresses of the memory array using one or more of a command chunk size or an address range of the memory access requests; reduce an operating rate of a first components of the memory control unit when the queued memory access requests are to sequential addresses of the memory array; and reduce an operating rate of a second components of the memory control unit when the queued memory access requests are to random addresses of the memory array.

In Example 22, the subject matter of Example 21 optionally includes a processor as the first component and a flash controller as the second component. The flash controller configured to transfer data between the memory control unit and memory array. The memory control unit is configured to reduce a frequency of a clock signal of the processor when the queued memory access requests are to sequential addresses of the memory array, and reduce a frequency of a clock signal of the flash controller when the queued memory access requests are to random addresses of the memory array.

In Example 23, the subject matter of one or both of Examples 21 and 22 optionally includes multiple memory arrays that include memory cells, and the memory control unit includes a queue for each memory array.

In Example 24, the subject matter of one or any combination of Examples 21-23 optionally includes the memory cells of the memory array being a subset of the total memory cells of a memory die.

In Example 25, the subject matter of one or any combination of Examples 21-25 optionally includes the memory array being included in a memory plane of a memory die.

These non-limiting examples can be combined in any permutation or combination. The above description is intended to be illustrative, and not restrictive. For example, the above-described examples (or one or more aspects thereof) may be used in combination with each other. Other embodiments can be used, such as by one of ordinary skill in the art upon reviewing the above description. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A memory device comprising:
a memory array including memory cells;
a communication interface configured for communicating with a host; and
a memory control unit operatively coupled to the memory array and the communication interface, and including a queue, the memory control unit configured to:
store requests to access the memory in the queue;
determine whether queued memory access requests are to sequential addresses of the memory array or to random addresses of the memory array;
reduce an operating rate of one or more first components of the memory control unit and maintain an operating rate of one or more second components when the queued memory access requests are to sequential addresses of the memory array; and
reduce the operating rate of the one or more second components of the memory control unit and maintain the operating rate of the one or more first components when the queued memory access requests are to random addresses of the memory array.

2. The memory device of claim 1, wherein the one or more first components includes a processor configured to process the requests to access the memory, and the memory control unit is configured to reduce a frequency of a clock signal of the processor when the queued memory access requests are to sequential addresses of the memory array.

3. The memory device of claim 1, including:
a flash controller configured to transfer data between the memory control unit and memory array;
wherein the one or more second components includes the flash controller, and the memory control unit is configured to reduce a frequency of a clock signal of the flash controller when the queued memory access requests are to random addresses of the memory array.

4. The memory device of claim 1, wherein the one or more second components includes error correction code (ECC) circuitry and the memory control unit is configured to reduce a frequency of a clock signal of the ECC circuitry when the queued memory access requests are to random addresses of the memory array.

5. The memory device of claim 1, including:
a bus configured to transfer data between the memory control unit and memory array;
wherein the memory control unit includes a flash controller to transfer data using the bus and a processor configured to process the requests to access the memory,
wherein the memory control unit is configured to:
reduce a frequency of a clock signal of the processor and maintain a frequency of a clock signal of the flash controller when the queued memory access requests are to multiple memory blocks of the memory array, and
maintain a frequency of a clock signal of the processor and reduce a frequency of a clock signal of the flash controller when the queued memory access requests are to single memory blocks of the memory array.

6. The memory device of claim 1, wherein the queued memory access requests are memory write requests.

7. The memory device of claim 1, wherein the queued memory access requests are memory read requests.

8. A method of operating a memory device, the method comprising:
queueing requests to access the memory using a command queue of the memory device;
determining whether the queued access requests are to a contiguous number of memory addresses of the memory array greater or less than a threshold number of contiguous addresses;
reducing an operating rate of one or more first components of the memory device and maintain an operating rate of one or more second components of the memory device when the queued access requests are to access greater than the threshold number of contiguous addresses; and
reducing an operating rate of the one or more second components of the memory device and maintain an operating rate of the one or more first components of the memory device when the queued access requests are to access less than the threshold number of contiguous addresses.

9. The method of claim 8, wherein the one or more first components include a processor of the memory device configured to process the requests to access the memory.

10. The method of claim 8, wherein the one or more second components include one or more of error correction code (ECC) circuitry of the memory device and a flash controller of the memory device, the flash controller configured to transfer memory write data and memory read data using a bus.

11. The method of claim 8,
wherein reducing an operating rate of the one or more first components includes reducing a frequency of a clock signal of the one or more first components and maintaining a frequency of a clock signal of the one or more second components when the queued access requests are to access greater than the threshold number of contiguous addresses; and wherein reducing an operating rate of the one or more second components includes reducing a frequency of a clock signal of the one or more second components and maintaining a frequency of a clock signal of the one or more first components when the queued access requests are to access less than the threshold number of contiguous addresses.

12. The method of claim 8, wherein the requests to access the memory are memory write requests.

13. The method of claim 8, wherein the requests to access the memory are memory read requests.

14. The method of claim 8, including reducing a data transfer rate of a bus of the memory device when the queued access requests are to access less than the threshold number of contiguous addresses.

15. The method of claim 8, wherein determining whether the queued access requests are to a contiguous number of memory addresses of the memory array greater or less than a threshold number of contiguous memory addresses includes determining using a command word included in the queued access requests.

16. The method of claim 8, wherein determining whether the queued access requests are to a contiguous number of memory addresses of the memory array greater or less than a threshold number of contiguous memory addresses includes determining using a command chunk size of the queued access requests.

17. A non-transitory computer readable storage medium comprising instructions configured to cause a memory control unit of a memory device to:
   queue requests to access the memory using a queue of the memory device;
   determine a command chunk size of the queued access requests;
   reduce an operating frequency of one or more first components of the memory device and maintain an operating frequency of one or more second components of the memory device when the command chunk size of the queued access requests is greater than a threshold command chunk size; and
   reduce an operating rate of one or more second components of the memory device and maintain an operating frequency of one or more first components of the memory device when the command chunk size of the queued access requests is less than the threshold command chunk size.

18. The non-transitory computer readable storage medium of claim 17, including instructions configured to cause the memory control unit to reduce an operating frequency of a processor of the memory control unit and maintain an operating frequency of a flash controller of the memory control unit when the command chunk size of the queued access requests is greater than or equal to the threshold command chunk size.

19. The non-transitory computer readable storage medium of claim 17, including instructions configured to cause the memory control unit to reduce an operating frequency of error correction code (ECC) circuitry of the memory control unit and maintain an operating frequency of a processor of the memory control unit when the command chunk size of the queued access requests is less than the threshold command chunk size.

20. The non-transitory computer readable storage medium of claim 17, including instructions configured to cause the memory control unit to:
   reduce a frequency of a clock signal of the one or more first components and maintain a frequency of a clock signal of the one or more second components when the command chunk size of the queued access requests is greater than or equal to a threshold command chunk size; and
   reduce a frequency of a clock signal of the one or more second components and maintain a frequency of a clock signal of the one or more first components when the command chunk size of the queued access requests is less than a threshold command chunk size.

* * * * *